May 24, 1932. E. AZOPARDI 1,860,217
ROAD CLEARANCE DEVICE
Filed Aug. 27, 1930 2 Sheets-Sheet 2
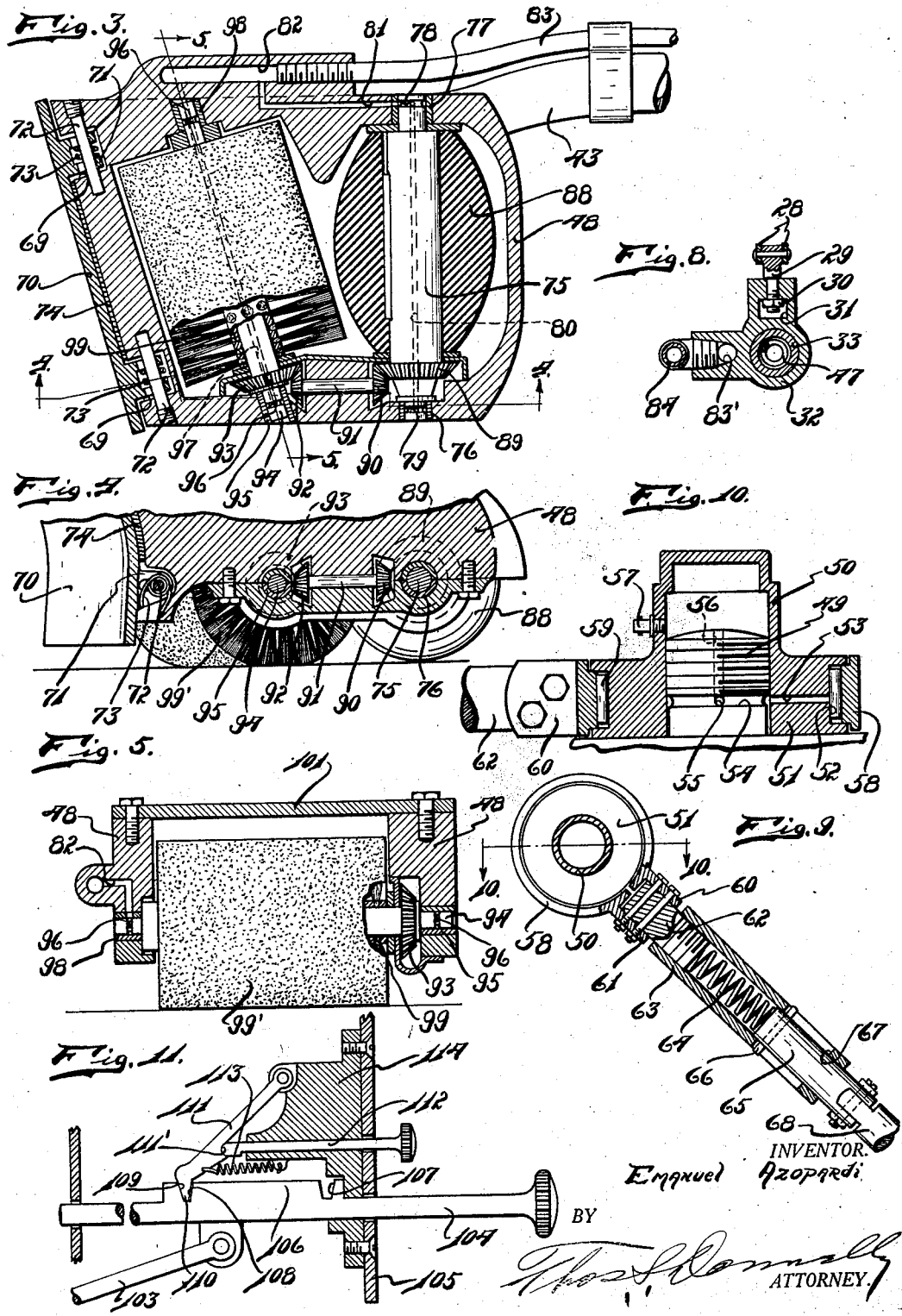

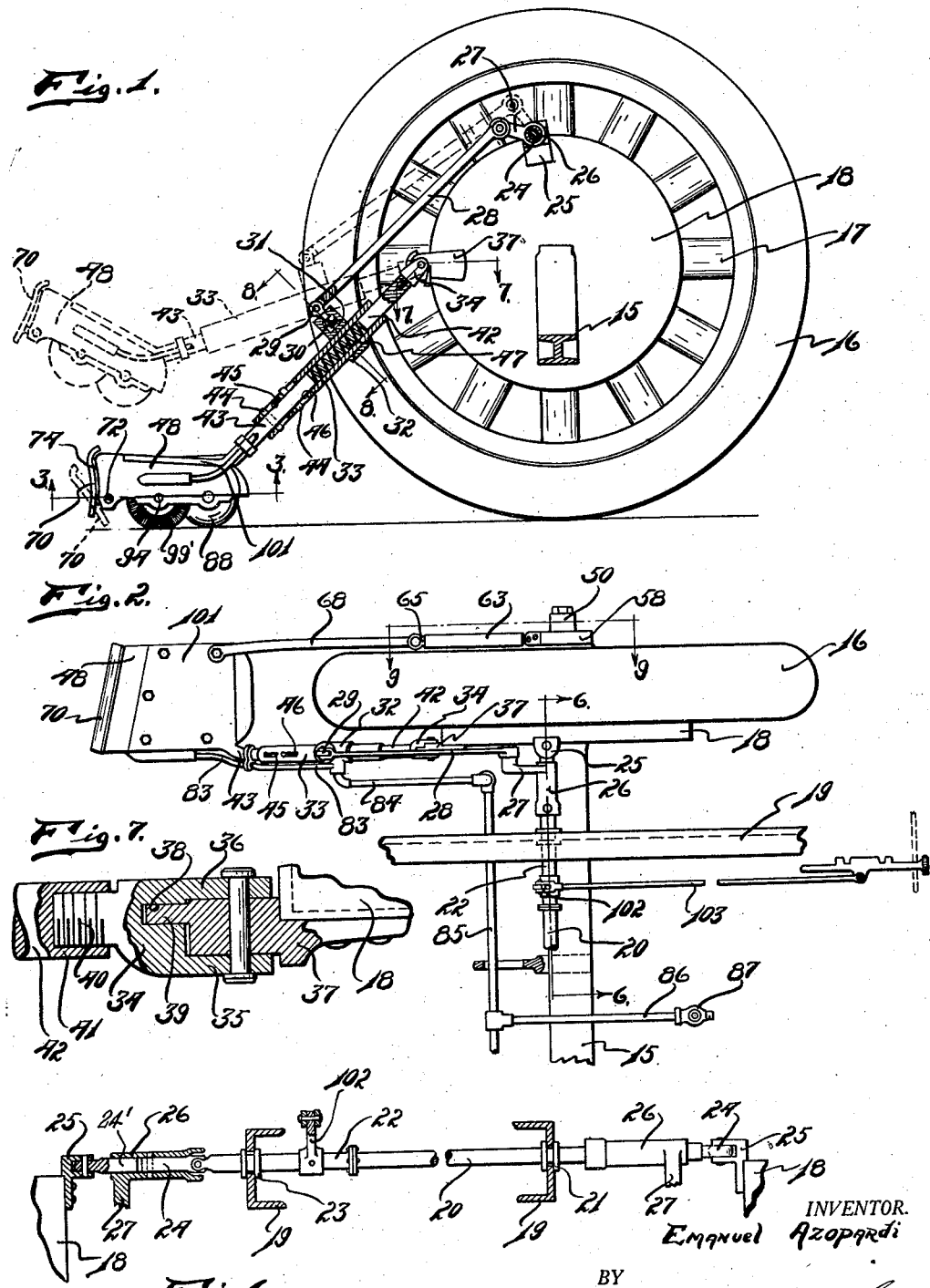

Patented May 24, 1932

1,860,217

UNITED STATES PATENT OFFICE

EMANUEL AZOPARDI, OF DETROIT, MICHIGAN

ROAD CLEARANCE DEVICE

Application filed August 27, 1930. Serial No. 478,014.

My invention relates to a new and useful improvement in a road clearance device for vehicles and has for its object the provision of mechanism whereby the road in front of the vehicle or that particular part of the road or street over which the wheels of the vehicle will pass may be cleared of loose obstructions and loose foreign material prior to the passage of the vehicle wheels thereover.

It is another object of the invention, by clearing the path of the road or street over which vehicle wheels may pass of loose obstructions, to render the driving of the vehicle easier and to reduce the wear on the vehicle tires.

Another object of the invention is the provision in a device of this class of a rotating member which will serve to sweep the road or street in front of the vehicle.

Another object of the invention is the provision in a device of this class of an engagement portion adapted for engaging heavy objects which may be positioned in the path of the vehicle wheels.

Another object of the invention is the provision of a clearance device of this class which may be easily and quickly moved to operative or inoperative position.

Another object of the invention is the provision of a device of this class which will be simple in structure, economical of manufacture, durable, and highly efficient in use.

Other objects will appear hereinafter.

The invention consists in the combination and arrangement of parts hereinafter described and claimed.

The invention will be best understood by a reference to the accompanying drawings which form a part of this specification, and in which, Fig. 1 is a side elevational view of the invention showing it applied with parts broken away and parts shown in section.

Fig. 2 is a fragmentary top plan view of a vehicle showing the invention applied.

Fig. 3 is a sectional view taken on line 3—3 of Fig. 1.

Fig. 4 is a fragmentary sectional view taken on line 4—4 of Fig. 3.

Fig. 5 is a sectional view taken on line 5—5 of Fig. 3.

Fig. 6 is a view taken on line 6—6 of Fig. 2.

Fig. 7 is an enlarged fragmentary sectional view taken on line 7—7 of Fig. 1.

Fig. 8 is an enlarged sectional view taken on line 8—8 of Fig. 1.

Fig. 9 is a view taken on line 9—9 of Fig. 2.

Fig. 10 is a view taken on line 10—10 of Fig. 9.

Fig. 11 is an enlarged sectional view through the operating mechanism.

The invention is intended primarily for use on vehicles such as automobiles and the like with which pneumatic tires are used. By clearing the road of loose obstructions such as loose rocks, bricks, nails, glass, etc. the comfort of riding is increased and the likelihood of excessive wear on the tire and the puncture of the same is reduced to a minimum.

In the drawings I have shown the invention used with a vehicle wheel which is rotatably mounted on the axle 15 and which is provided with the pneumatic tire 16, the spokes 17, and the stationary brake drum 18.

The chassis rails 19 are illustrated as extending at right angles to the axis 15. Projected through one of the chassis rails 19' is a shaft 20 having a collar 21 mounted thereon to prevent longitudinal movement of the shaft 20. The shaft 20 is connected to an extension shaft 22 which is extended through the other chassis rail 19' and provided with a collar 23. Pivotally connected to the end of the shaft 22 is an extension shaft 24. A stub shaft 24' is pivotally connected to the bracket 25 which is mounted on the brake drum 18 and engages in the sleeve 26. Fixedly mounted on the extension 24 is a sleeve 26 having the crank arm 27 projected outwardly from adjacent one end. This crank arm is connected pivotally to one end of the rod 28, the other end of which is pivotally connected to the eye bolt 29 which is provided with the nut 30 engaging in the chamber 31 formed in the collar 32. This collar 32 is fixedly mounted in embracing relation on the sleeve 33. A bracket 37 is fixedly mounted on the brake drum 18 and provided with the outwardly projecting tongue 39 which engages in the slot 38 formed in the connecting link 34 and extending outwardly from which is the threaded extension 40 which threads into the socket 41 formed in the rod 42. The link 34 is provided with yoke arms 35 and 36 which embrace the bracket 37 and to which the bracket 37 is pivotally mounted as shown in Fig. 7. The shaft 42 slidably engages in the sleeve 33. This sleeve 33 is provided with longitudinally extending slots 45 and 46 in which engage pins 44 which are projected through the shaft 43 which slidably engages in the sleeve 33. A spring 47 is positioned in the sleeve 33, one end thereof engaging the inner end of the shaft 43 and the other end engaging the inner end of the shaft 42.

A housing 48 is provided with a cover 101 to which is fixedly attached the angularly turned end of the shaft 43. Mounted on the axle 49 of the vehicle wheel is a hub cap having the cup shaped portion 50 and the flange 51. A peripheral groove 52 is formed in the hub 51 and in communication through the passage 53 with the peripheral groove 54 formed in the axle 49. A radial passage 55 establishes communication between the groove 54 and the interior of the cup shaped portion 50 of the hub cap through the axially directed passage 56 so that lubricant delivered through the lubricant valve 57 into the interior of the cup shaped portion 50 of the hub cap may serve to lubricate the roller bearings 59 which are positioned in the groove 52 and engaged by the collar 58 which embraces the flange 51. Spaced lugs 60 and 61 project outwardly from the collar 58 and are attached to the stud 62 which engages therebetween and which is threaded into the sleeve 63 so as to engage one end of the spring 64, the other end of which engages the stub shaft 65 which is slidably inserted in the sleeve 63 and retained therein by the pin 66 which is projected therethrough and rides in the longitudinal slots 67. Pivotally connected at one end to the outer end of the stub shaft 65 is an arm 68, the opposite end of which is attached to the cover plate 101.

Swingably mounted on the forward end of the housing 48 is a bumper plate 70. Spaced lugs 71 project inwardly from this bumper plate at opposite ends and engage in the recesses 69 formed in the forward side of the housing 48. Threaded in the housing 48 so as to project through the recesses 69 and through enlarged openings formed in the lug 71 are pins or screws 72 which serve to pivotally mount the bumper plate 70 on the housing 48. Embracing these pins or screws 72 is a spring 73 which serves to resist rocking movement of the bumper plate relatively to the housing.

A yieldable pad 74 is positioned between the bumper plate 70 and the forward side of the housing 48 to serve as a shock absorber where stationary objects are struck by the bumper plate 70. Because of the enlarged openings in the lugs 71, sudden blows delivered to the bumper plate 70 are not transmitted to the pin 72. In Fig. 1 this bumper plate is shown in dotted lines as rocked against the tension of the spring 73 so that should stationary objects be encountered, the bumper plate 73 will rock to the dotted line position shown in Fig. 1 and thus serve as an inclined body to ride over the stationary object and serve to elevate the mechanism as the vehicle is driven forwardly until the stationary obstruction has been cleared.

A shaft 75 extends transversely of the housing 48 and is rotatably mounted thereon, this shaft being journaled at its opposite ends in bearings 76 and 77 and having at its opposite ends peripheral grooves 78 and 79 which communicate through radial passages with the axially directed lubricant passage 80 which is in communication with the passage 81 with the lubricant chamber 82. A lubricant supply pipe 83 is fastened in communication with the chamber 82 for delivering lubricant thereto. This pipe 83 communicates through the pipes 84, 85 and 86 and the pet cock 87 with the oil pan or lubricant supply reservoir of the vehicle. Mounted fixedly on the shaft 75 is a traction wheel 88. It will be noted that the shaft 75 is mounted at the rear of the housing 48 and this traction wheel 88 serves as a support for the housing when it is moved into operative position so that the traction wheel 88 may contact with the ground or surface over which the vehicle is driven.

Fixedly mounted on the shaft 75 is a bevel gear 89 which meshes with a bevel gear 90 fixedly mounted on the shaft 91. A bevel gear 92 fixedly mounted on the shaft 91 meshes with the gear 93 which is fixedly mounted on the shaft 94. This shaft 94 is journaled in bearings 95 and 98 and is provided at its opposite ends with the peripheral lubricant grooves 96 communicating with the axially directed passage 97 which is in communication with the chamber 82. Fixedly mounted on the shaft 94 is a bristle bearing sleeve 99 which serves as a brush or sweeping element for removing obstructions encountered. It is believed obvious that when the wheel 88 is rotating, the brush element is also rotating in the opposite direction.

An arm 102 is attached to and projects radially outwardly from the shaft extension 22 and is connected by the rod 103 to the operating handle 104 as shown in Figs. 2 and 11. This operating handle 104 projects through the dash 105 of the vehicle and through a flange on the head 114 which is secured to the dash 105. Projecting radially outwardly from the operating handle 104 intermediate its ends is a plate 106 in which are formed slots 107 and 108. One face 109 of these slots is inclined to conform to the inclination of the face of the nose 110 of the dog 111 which engages in the notch. This dog 111 is swingably mounted on the head 114. One end of the spring 113 is attached to the dog 111 and the other end is attached to the head 114. A release rod is slidably projected through the head 114 and is adapted to engage the recess 111′ formed in the dog 111 so that when the parts are in the position shown in Fig. 11 an inward pressing of the release rod 112 will release the nose 110 from the notch in which it is engaged and permit slidable movement of the handle 104.

In operation, under normal conditions, when the road over which the vehicle is being propelled is free from loose obstructions, the handle 104 will be moved to the position shown in Fig. 11 thus rocking the shaft 102 so as to swing the housing 48 to the dotted line position shown in Fig. 1. When it is desired to set the mechanism into operation for clearing the path of the vehicle from obstructions, the release rod 112 would be shoved inwardly to disengage the nose 110 from the notch 108 and the operating handle 104 would then be shoved inwardly to permit a downward rocking of the shaft 102 and thus permitting a swinging of the housing 48 into the position shown in full lines in Fig. 1. The traction wheel 88 would then be rotated and effect a rotation of the brush for sweeping purposes. It will be noted that this brush rotates on an axis inclined to the transverse axis of the vehicle on which used so that the sweeping would be forwardly and outwardly toward one side of the direction of travel of the vehicle.

The housing is mounted in a floating condition by virtue of the slidable relation of the members 43 and 65 in the sleeves 33 and 63 respectively so that the mountings on the brake drum will be relieved of sudden shock or jar and a durable structure provided. It is believed obvious that the moving parts are well lubricated.

By virtue of the pivotal connections which have been described, the angular turning of the front wheels of the vehicle will not affect the operativeness of the device as sufficient pivotal connections have been provided for such universal movement as may be necessary.

While I have illustrated and described the preferred form of construction of my invention, I do not wish to limit myself to the precise details of structure shown but desire to avail myself of such variations and modifications as may come within the scope of the appended claims.

Having thus described my invention, what I claim as new and desire to secure by Letters Patent is:

1. In a device of the class described adapted for use with a vehicle wheel capable of angular turning, supporting members projecting forwardly of and downwardly from said vehicle wheel; a housing supported on and movable relatively to said supporting members; a sweeping element in said housing; and yieldable means for resisting relative movement of said housing and said supporting members.

2. In a device of the class described adapted for use with a vehicle wheel capable of angular turning, supporting members projecting forwardly of and downwardly from said vehicle wheel; a housing supported on and movable relatively to said supporting members; a sweeping element in said housing; yieldable means for resisting relative movement of said housing and said supporting members; and means for swinging said housing to operative and inoperative position.

In testimony whereof I have signed the foregoing specification.

EMANUEL AZOPARDI.